(No Model.)  6 Sheets—Sheet 2.
W. B. AVERY.
APPARATUS FOR WEIGHING GRAIN.

No. 383,032. Patented May 15, 1888.

(No Model.) 6 Sheets—Sheet 4.
W. B. AVERY.
APPARATUS FOR WEIGHING GRAIN.

No. 383,032. Patented May 15, 1888.

(No Model.)  6 Sheets—Sheet 5.

W. B. AVERY.
APPARATUS FOR WEIGHING GRAIN.

No. 383,032.  Patented May 15, 1888.

Witnesses:

Inventor
William B. Avery
By his attorneys
Brown & Hall (No Model.) 6 Sheets—Sheet 6.

W. B. AVERY.
APPARATUS FOR WEIGHING GRAIN.

No. 383,032. Patented May 15, 1888.

UNITED STATES PATENT OFFICE.

WILLIAM B. AVERY, OF DIGBETH, BIRMINGHAM, COUNTY OF WARWICK, ENGLAND.

APPARATUS FOR WEIGHING GRAIN.

SPECIFICATION forming part of Letters Patent No. 383,032, dated May 15, 1888.

Application filed November 11, 1886. Serial No. 218,531. (No model.) Patented in England May 1, 1886, No. 5,931; in France October 2, 1886, No. 178,828; in Belgium October 14, 1886, No. 74,839; in Germany October 16, 1886, No. 39,088; in Spain January 17, 1887, No. 6,507; in India January 22, 1887, No. 140, and in Austria-Hungary March 17, 1887, No. 43,916.

*To all whom it may concern:*

Be it known that I, WILLIAM BEILBY AVERY, of 12½ Digbeth, Birmingham, in the county of Warwick, England, have invented certain new and useful Improvements in Machinery for Weighing Grain and other Substances, (for which I have obtained patents in the countries hereinafter named, dated and numbered as follows, namely: in England, dated May 1, 1886, No. 5,931; in France, dated October 2, 1886, No. 178,828; in Belgium, dated October 14, 1886, No. 74,837; in Germany, dated October 16, 1886, No. 39,088; in Austria-Hungary, dated March 17, 1887, No. 43,916; in Spain, dated January 17, 1887, No. 6,507, and in British India, dated January 22, 1887, No. 140, register No. 235 of 1886,) of which the following is a specification.

The object of the present invention is to provide a simple and compact machine for automatically weighing grain and other substances and delivering the same either into sacks or other packages or into bulk, as may be thought desirable.

In the accompanying drawings I have shown various views of my improved construction of weighing-machine.

Figure 1:
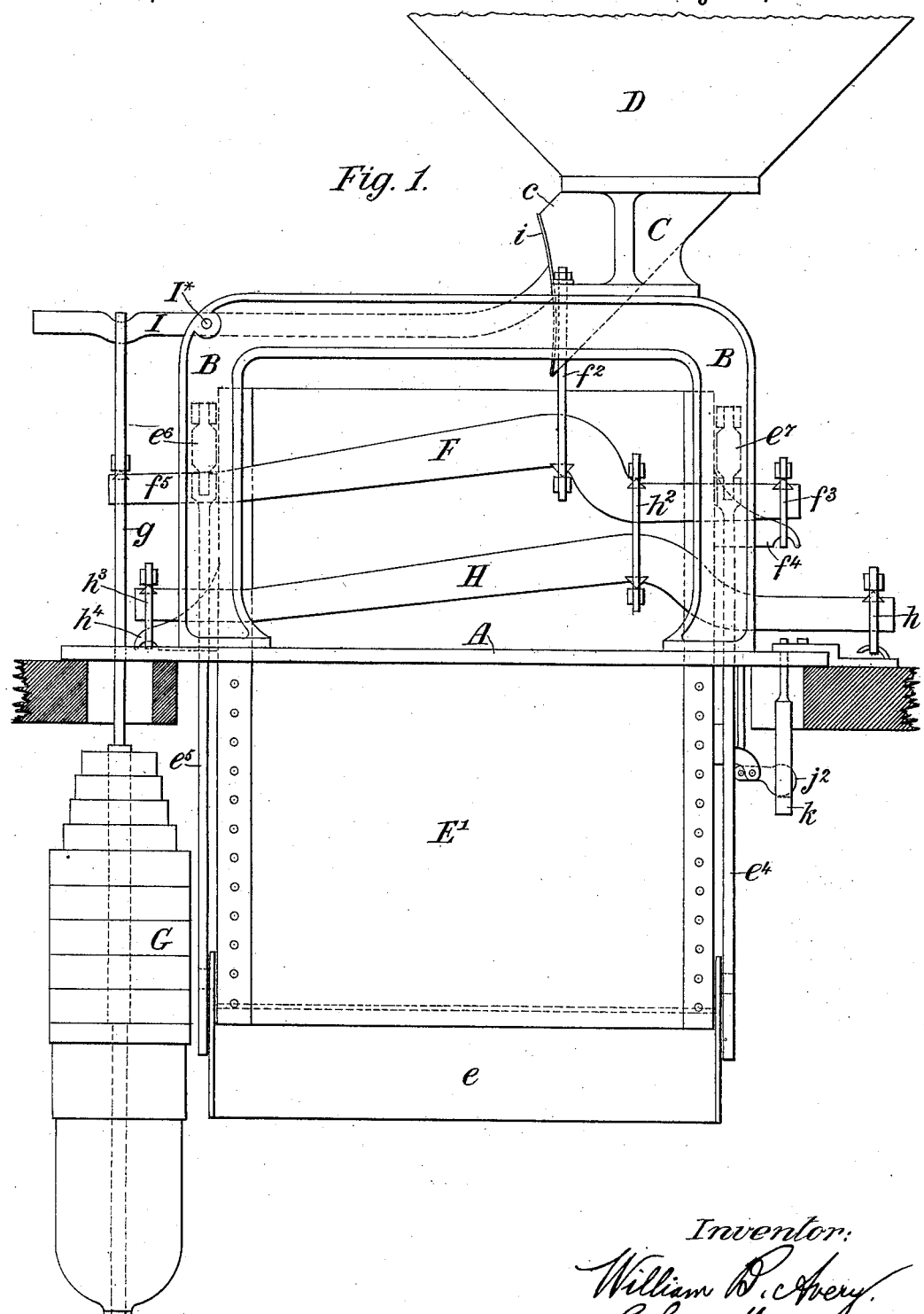
Figure 2:
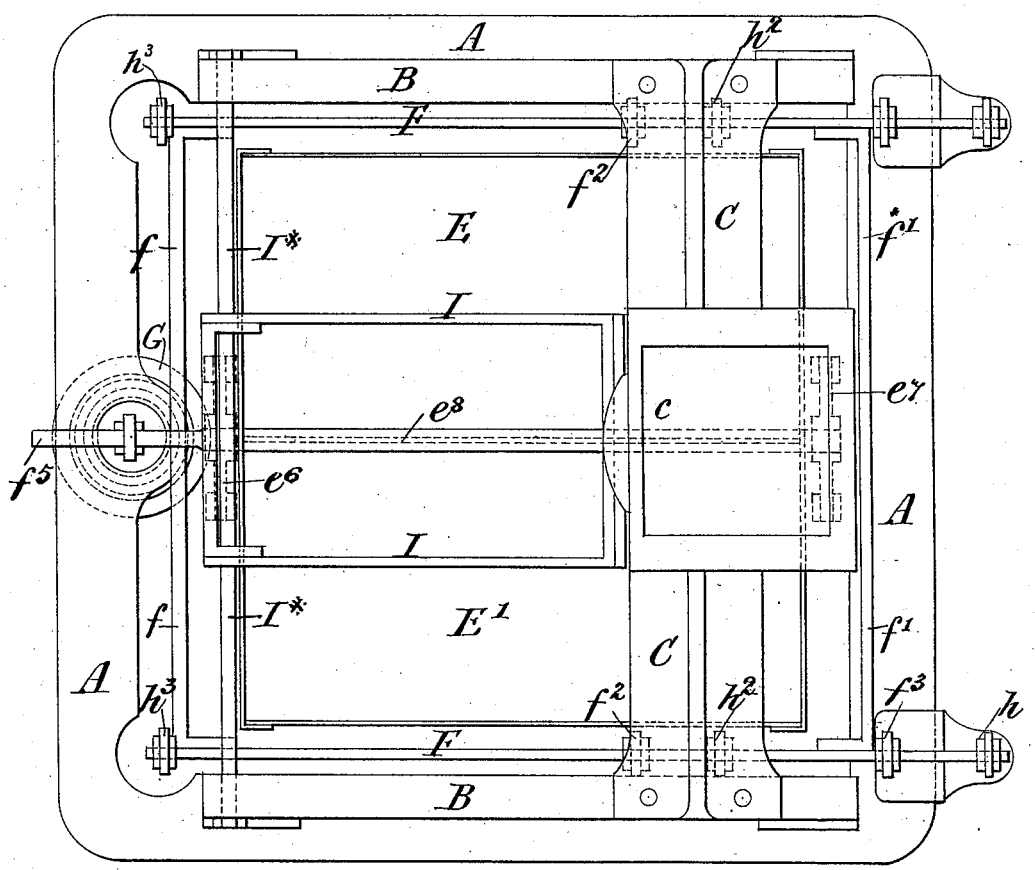
Figure 3:
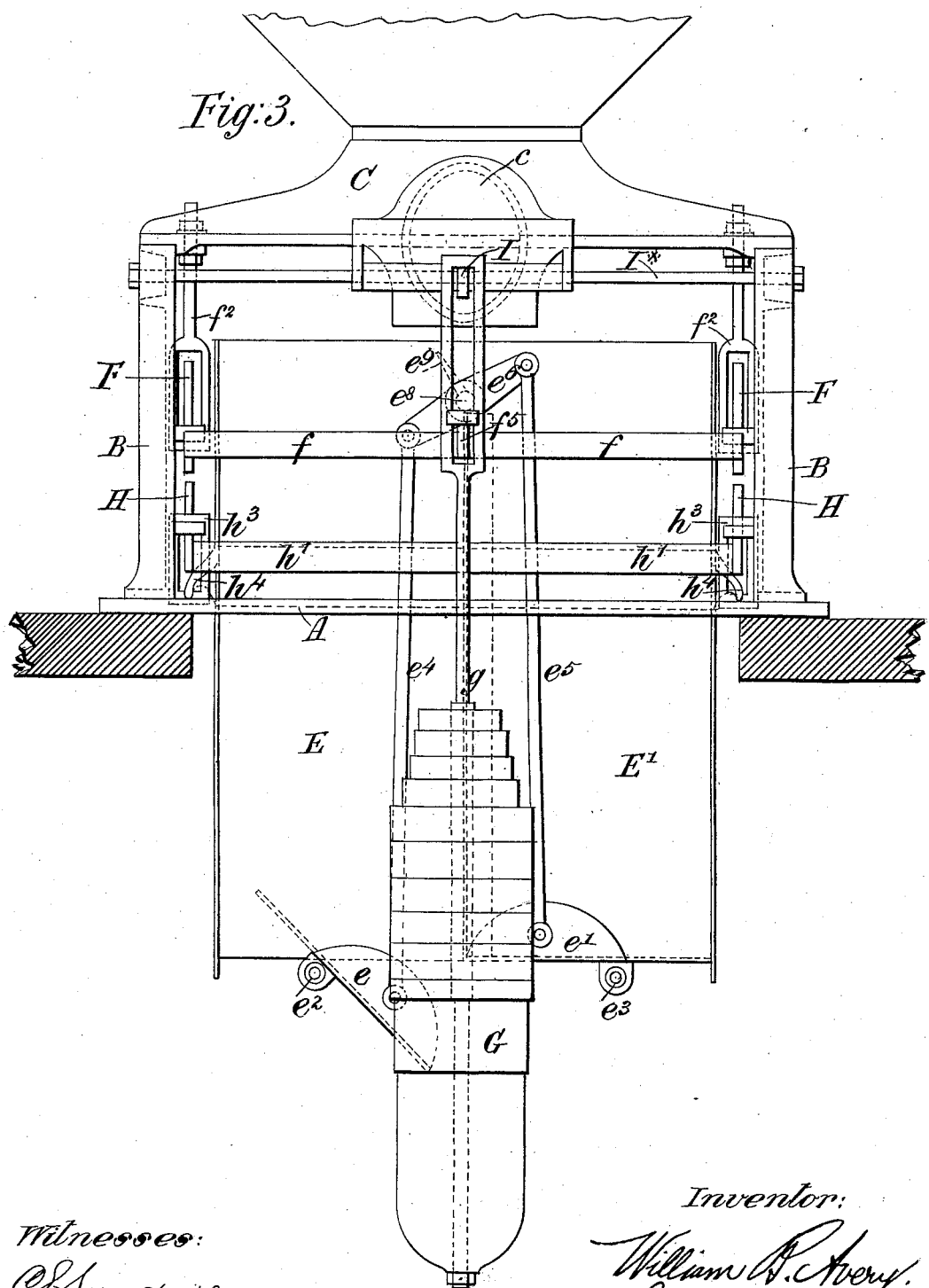
Figure 4:
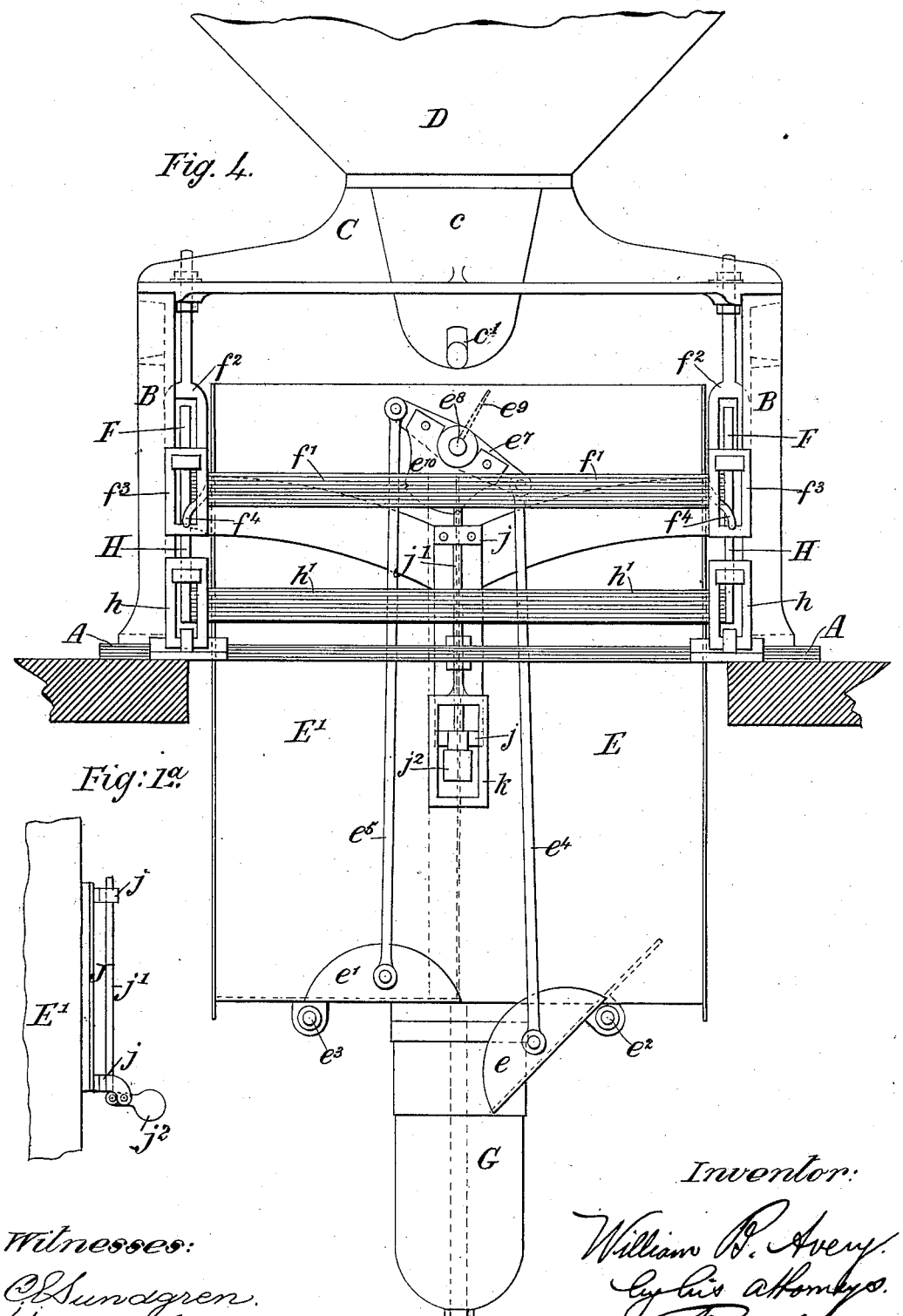
Figure 5:
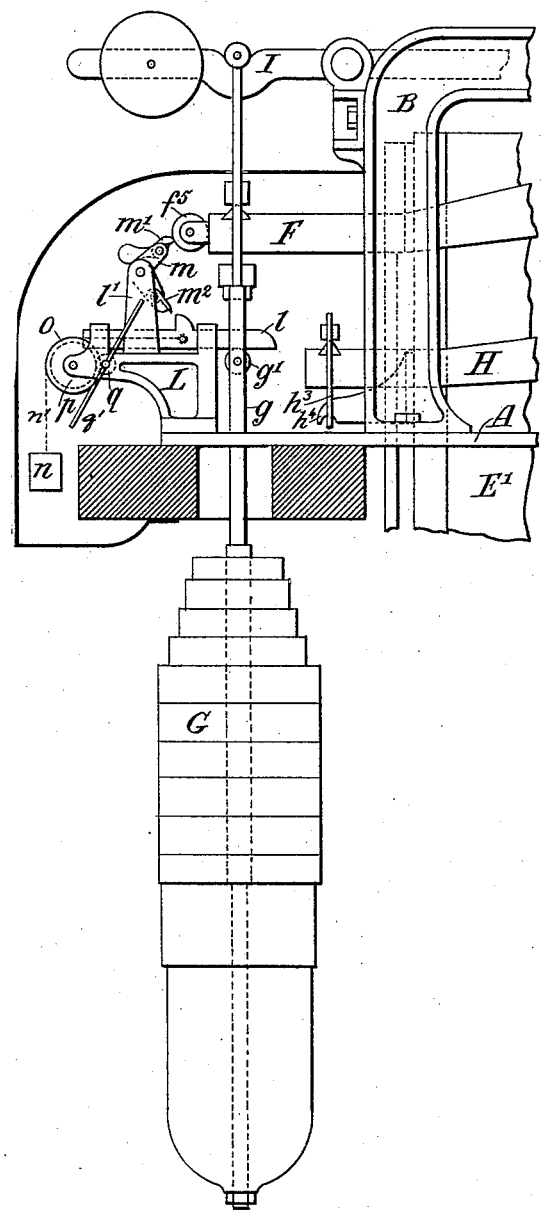
Figure 6:
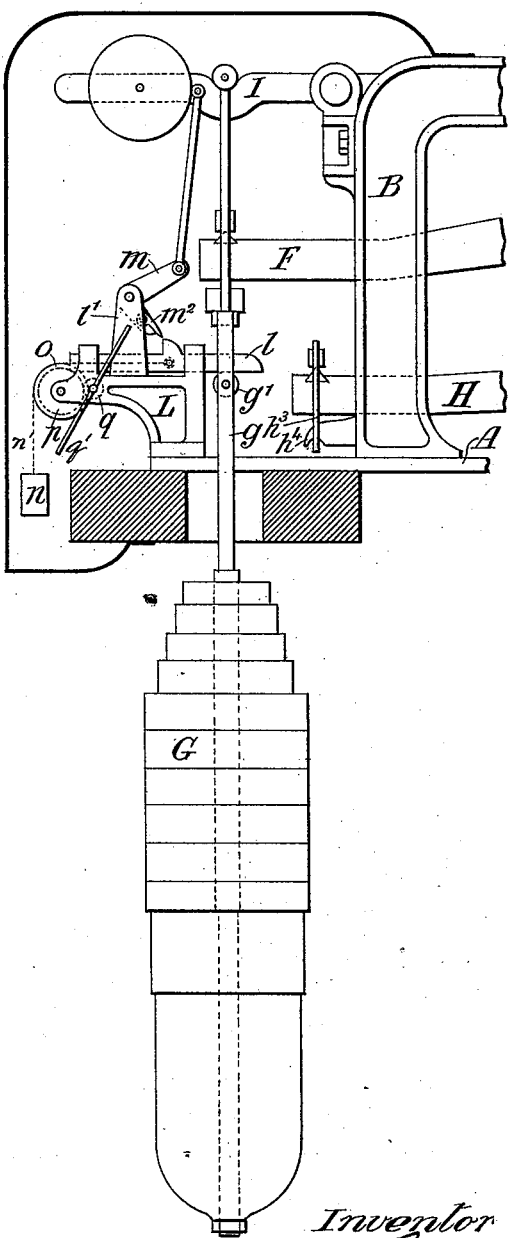
Figure 7:
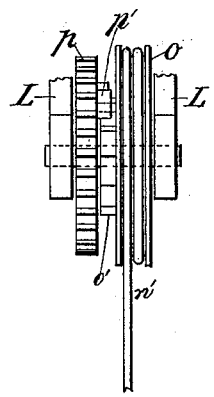
Figure 8:
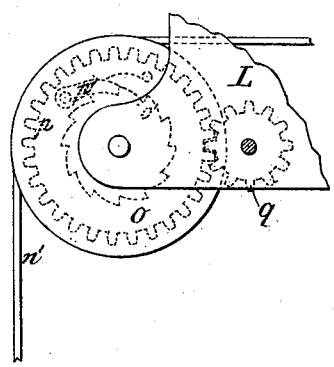

Figure 1 is a front elevation, and Fig. 2 a plan view, the supply-hopper being removed in order that it may not obstruct the view of the parts beneath. Fig. 3 is an elevation from the left-hand side of Fig. 1, and Fig. 4 is a similar view from the right-hand side of Fig. 1. Fig. 1$^a$ is a side view of the locking-bolt for locking the movable bottoms of the weighing-receptacle. Fig. 5 is a side view of apparatus for checking the downward momentum of the weighing-levers. Fig. 6 is a similar view of similar apparatus, showing a permanent connection of it with the weighing-machine. Figs. 7 and 8 are respectively side and front views of certain parts of the momentum-checking apparatus on a larger scale than the other apparatus.

Similar letters of reference indicate corresponding parts in the several figures.

The machine is shown as fitted above a rectangular opening in the floor of a granary; but it will be obvious that it may be readily adapted to other situations, as may be found desirable.

A A is a rectangular metal frame, which is bolted or otherwise secured to the floor, and to this frame are bolted two vertical bridge-frames, B B, one on either side, the frames being connected together by a bridge or cross-piece, C C, which carries a supply-hopper, D, and a spout or chute, $c$, for delivering the grain to the weighing apparatus from the hopper.

E E' is a rectangular box or receptacle for containing the grain to be weighed, and this box or receptacle is divided into two compartments by a transverse vertical partition, each compartment being provided with a balanced tilting bottom or door, $e$ $e'$, supported on centers $e^2$ $e^3$. These tilting bottoms are severally connected on either side of the box by means of link-rods $e^4$ $e^5$ to rock-levers $e^6$ $e^7$, mounted on opposite ends of a rock-shaft, $e^8$, which extends across the box E E' and projects through either side thereof. Secured upon the rock-shaft $e^8$, in the plane of the division plate or partition, is a leaf or flap, $e^9$, which serves to deflect the stream of corn from the chute $c$ into one or other of the compartments of the box E E', as will be hereinafter more fully explained.

F F are a pair of levers, one on either side of the box or receptacle E E', which levers are connected together by cross-bars $f$ $f'$, and are carried by and have their fulcra on knife-edges in the links $f^2$ $f^2$, pendent from the bridge C. The shorter arms of these levers are provided with links $f^3$ $f^3$, into which take hooked brackets $f^4$ $f^4$, secured to the right-hand side of the box E E' above the center of gravity thereof. The cross-bar $f$, which connects the longer arms of the levers F F, is provided with a tail, $f^5$, from the extremity of which is suspended by means of a rod, $g$, the counterbalance-weight G.

H H are a second pair of levers, one on either side of the box E E', having their fulcra on the links $h$ $h$, which may be secured to the frame A or to the floor. These levers H H are connected together at their opposite ends, like the levers F F, by cross-bars $h'$ $h'$, and are also respectively connected to the levers F F by means of the links $h^2 h^2$. At the ends opposite to their fulcra these levers H H carry links $h^3 h^3$, into which take hooked brackets $h^4 h^4$, attached to the left-hand side of the receptacle E E', above the center of gravity thereof. The arrangement of levers F and H, as described, forms a compound lever or weighing-beam which surrounds and supports the box E E'. By this arrangement of parts the parallel movement of the box is insured, and the box being, so to speak, inclosed within the weighing-beam, a simple and compact weighing-machine having great strength and steadiness is obtained.

The rod $g$, by which the weight G is suspended from the tail $f^5$ of the levers F, is extended upward, and is connected by a link to a tail formed at one end of a rocking frame, I. This frame is mounted on a rock-shaft, I*, which has its bearings in the side frames, B B, and is provided with a curved shutter or gate, $i$, which serves to close the mouth of the chute $c$ of the hopper D.

In order to retain the tipping bottoms of the receptacle E E' in a closed position during the filling operation, I provide a locking device composed as follows: On the side of the receptacle E E' is fixed a plate, J. (See the detached view, Fig. 1ª.) This plate is provided with two sockets, $j\ j$, which serve to carry a sliding bolt, $j'$. The lower socket, $j$, is prolonged and turned down, as shown in the drawings, to form a bracket, in which is pivoted a weighted lever, $j^2$, one end of which is pivoted to the lower end of the sliding bolt $j'$. The weighted end of the lever $j^2$ works or moves in a link frame or stirrup, $k$, adjustably fixed on the under side of the rectangular frame A of the machine, or in any other convenient position. The rock-lever $e^7$ on the end of the rock-shaft $e^8$ is fitted with a quadrant-shaped plate, $e^{10}$, having at each corner a notch, into one or other of which the upper end of the sliding bolt $j'$ takes alternately. Now, supposing the supply-hopper D to be filled with grain, and that a sufficient quantity has passed out through the chute $c$ to nearly fill the compartment E' of the receptacle E E', the parts will be in the position shown in the drawings—that is to say, the receptacle E E' will have descended nearly to its lowest position, the counterbalance-weight G will be raised, and the shutter or gate $i$ will have closed the chute $c$. A small quantity of grain will, however, be allowed to trickle through a small opening, $c'$, on the under side of the chute, or in the gate or shutter, in order to make up the required quantity of grain in the receptacle E E'. When this is obtained, the receptacle will make a further movement downward to its lowest position. As the receptacle makes its final descent the weighted end of the lever $j^2$ will come in contact with the bottom of the stirrup $k$ and will withdraw the locking-bolt from the notch in the plate $e^{10}$. The tipping bottom of the full compartment will now be free to rock or tip under the weight of the grain contained therein, and will thereby discharge its load. At the same time the lever $e^7$ will be rocked on its shaft by the opening of the door, and will tilt over the leaf $e^9$, so as to direct the grain from the chute $c$ into the empty compartment of the receptacle, which will then be filled and discharged in the same manner. This operation will be continued, the compartments E and E' being alternately filled and emptied as long as the hopper D is supplied with grain.

In order to check the first descent of the receptacle and prevent the premature discharge of the grain or other material that is being weighed, I provide an automatic momentum-checking apparatus, which I will now describe with reference to Figs. 5, 7, and 8. This momentum-checking apparatus is represented as all carried by a small fixed standard, L, bolted to the bed-plate A. The principal part of this apparatus is a stop which is caused to be presented at a proper time in the way of the weighing-beam or weighing-receptacle. The said stop is represented as consisting of a sliding bolt, $l$, fitted to work freely in guides in the bracket L. Pivoted in standards $l'$, cast in one with the bracket-standard L, is a bell-crank lever, $m$, at each extremity of which is pivoted a trip-pawl, $m'\ m^2$. The tail of the lever F is slightly prolonged, and its outer end is fitted with an anti-friction roller, $f^5$, and a similar roller, $g'$, is pivoted on the rod $g$ of the weight G. A weight, $n$, is connected with the bolt $l$ by a cord, $n'$, which passes over a pulley, $o$, supported in the standard L. Mounted loosely on the axle of the pulley $o$ is a spur-wheel, $p$, which gears into a pinion, $q$, fitted with a flier, $q'$, and journaled in the standard L. The pulley $o$ carries a ratchet-wheel, $o'$, on its side, and a spring-pawl, $p'$, is carried by the spur-wheel $p$. The pawl being attached to the spur-wheel and the ratchet-wheel to the pulley, when the bolt is forced forward in the opposite direction to that in which the weight and cord tend to draw it, the pawl slips over the ratchet and the spur-wheel and flier are not actuated, and hence there is no obstacle to the rapid forward movement of the bolt; but when the bolt is drawn back by the weight and cord the ratchet-wheel and pawl lock the spur-wheel to the pulley, and the spur-wheel gearing with the pinion on the flier-spindle, the return movement of the bolt is retarded. The operation of this momentum-checking mechanism in connection with the weighing-machine is as follows:

In the normal position of the weighing-machine the lever F will lie just below the trip-pawl $m'$ of the bell-crank lever $m$, and the bolt $l$ will be drawn back by the weight $n$ from its position over the roller $g'$ on the weight-rod $g$. When the receptacle E E' makes its first descent, the lever F will rise, and the roller $f^5$, striking against the trip-pawl $m'$, will trip the bell-crank lever $m$ and cause its lower extremity to strike against a lug on the upper side of the bolt $l$ and drive it forward over the roller $g'$ on the rod $g$. This will have the effect of arresting the rise of the rod $g$ and consequently the descent of the receptacle E E', and will thereby prevent the premature unlocking of the tipping bottom and consequent discharge of the grain, and also check the momentum of the descent. The sudden forward movement of the bolt $l$ over the roller $g'$ not only arrests the momentum of the descent of the weighing - receptacle, but stops the descent positively for a very short time. The ratchet-and-pawl arrangement above described permits of this sudden forward movement of the bolt without operating the spur-wheel and fly-pinion. The bolt will now be drawn back by the weight, but the return movement will be retarded and regulated by the spur-wheel and flier. Sufficient time will thus be given for the grain trickling through the opening $c'$ to make up the exact weight, when the receptacle E E' will slowly complete its descent, as above described.

In the modification shown in Fig. 6, instead of an anti-friction roller being provided for striking the bell-crank lever $m$, the upper extremity of the bell-crank lever is connected by a link-rod to the end of the lever I. Similar letters are used to denote similar parts, and the action of the apparatus is identical with that just described.

It will be evident that the momentum-checking apparatus may be so arranged that the bolt will be shot into a recess in the receptacle E E' or over any other convenient part of the apparatus. It will be further evident that, if desired, any suitable counting mechanism may be adapted to the improved grain-weighing machine.

Hitherto, so far as known to me, the weighing-receptacle in that class of weighing-machines known as "grain-meters" has been carried on the top of the beam, in which case means for steadying it have been required to the detriment of the proper weighing, or else the receptacle has been suspended from the beam, thus involving a good deal of room. By inclosing the receptacle within the beam, as herein described, the whole machine is made to occupy little more space than the receptacle itself, and the receptacle being supported on both sides, it is unnecessary to provide any special steadying devices.

What I claim as my invention, and desire to secure by Letters Patent, is—

1. The combination, in a weighing-machine, of a single box or receptacle for containing the substance to be weighed, and two sets of weighing-levers connected together and both surrounding the said box or receptacle, each set being connected with the said box or receptacle independently of the other, and one being connected with one side of said box or receptacle and the other with the opposite side thereof, substantially as herein described.

2. The combination, in a weighing-machine, of a single box or receptacle for containing the substance to be weighed, and two connected sets of weighing-levers surrounding the box one above another and connected with the box or receptacle independently of each other above the center of gravity thereof, one on one side and the other on the opposite side thereof, substantially as herein described.

3. The combination, with the box or receptacle E E', of the pair of levers F and their connections $f$, the pair of levers H and their connections $h'$, the said levers and their connections surrounding the box or receptacle, one pair above the other, the fixed fulcra $f^2$ and $h$ for the two pairs of levers, the independent connections $f^3$ $f^4$ and $h^3$ $h^4$ between the respective pairs of levers and the opposite sides of the box or receptacle, and the counterbalance-weight G, suspended from the levers F, all substantially as herein described.

4. The combination, with the box or receptacle E E', having two compartments and the tilting bottoms $e$ $e'$, of the rock-shaft $e^8$ and its attached rock-levers $e^6$ $e^7$ and notched quadrant-plate $e^{10}$, the connections $e^4$ $e^5$ between said rock-levers and tilting bottoms, the bolt $j$, attached to the box, for engaging with the notches of the quadrant-plate, the weighted lever for holding up the said bolt, and the fixed stirrup $k$, for operating on said weighted lever to produce the withdrawal of the bolt from the notches of the quadrant-plate, all substantially as herein described.

5. The combination, with the weighing-receptacle, of an arresting-bolt, a tripping-connection, substantially as herein described, between said bolt and receptacle, for producing the arrest of the descent of the receptacle by the bolt, and means, substantially as herein described, for automatically withdrawing the bolt to liberate the receptacle, as and for the purpose herein set forth.

6. The combination, with the weighing-beam or weighing-receptacle, of the sliding stop-bolt $l$, the lever $m$, having a connection, substantially as herein described, with the beam or receptacle, and a trip-connection, $m^2$, with the bolt, the weighted cord $n'$, attached to the bolt, the pulley $o$ for said cord, the fly $q'$, and the ratchet-wheel $o'$, pawl $p'$, and spur-gearing $p$ $q$ between the pulley and fly, all substantially as and for the purpose herein set forth.

Dated the 26th day of October, 1886.

W. B. AVERY.

Witnesses:
R. A. PINSENT,
39 *Waterloo Street, Birmingham, England, Solicitor and Commissioner to administer oaths in the Supreme Court of Judicature.*
H. G. SILK,
39 *Waterloo Street, Birmingham, Clerk.*